United States Patent
Miyahara (10) Patent No.: US 11,861,844 B2
(45) Date of Patent: Jan. 2, 2024

(54) TERNARY IMAGE OBTAINING METHOD AND APPARATUS, AND VEHICLE

(71) Applicant: GREAT WALL MOTOR COMPANY LIMITED, Hebei (CN)

(72) Inventor: Shunji Miyahara, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 399 days.

(21) Appl. No.: 17/256,844

(22) PCT Filed: Jun. 28, 2019

(86) PCT No.: PCT/CN2019/093770
§ 371 (c)(1),
(2) Date: Dec. 29, 2020

(87) PCT Pub. No.: WO2020/001630
PCT Pub. Date: Jan. 2, 2020

(65) Prior Publication Data
US 2021/0256273 A1    Aug. 19, 2021

(30) Foreign Application Priority Data
Jun. 29, 2018    (CN) .......................... 201810711921.7

(51) Int. Cl.
*G06T 7/11*       (2017.01)
*G06T 7/13*       (2017.01)
(Continued)

(52) U.S. Cl.
CPC .................. *G06T 7/13* (2017.01); *G06T 7/11* (2017.01); *G06V 20/56* (2022.01); *G06V 20/58* (2022.01);
(Continued)

(58) Field of Classification Search
CPC ... G06T 7/11; G06T 7/13; G06T 2207/20012; G06T 2207/30252; G06V 20/56; G06V 20/58; G06V 20/588; G06V 2201/07
See application file for complete search history.

(56) References Cited

U.S. PATENT DOCUMENTS

| 6,111,981 A | 8/2000 | Tsubusaki et al. |
| 2002/0144215 A1 | 10/2002 | Hoskote et al. |

(Continued)

FOREIGN PATENT DOCUMENTS

| CN | 101277365 A | 10/2008 |
| CN | 101888469 A | 11/2010 |

(Continued)

OTHER PUBLICATIONS

Chan et al. ("Adaptive thresholding by variational method," IEEE Transactions on Image Processing (vol. 7, Issue: 3, Mar. 1998)) (Year: 1998).*

(Continued)

*Primary Examiner* — Yubin Hung
(74) *Attorney, Agent, or Firm* — NIXON PEABODY LLP; Jeffrey L. Costellia (57) ABSTRACT

A method for edge identification of a self-shadowing object based on a visual camera and a vehicle includes: collecting image data of an object to be identified, and performing differentiation processing; according to a preset threshold, performing three-value processing to the image that has been differentiation-processed, to acquire a three-value-processed image including positive-direction boundary pixels and negative-direction boundary pixels; according to the positive-direction boundary pixels and the negative-direction boundary pixels, acquiring a positive-direction straight linear segment and a negative-direction straight linear segment that represent boundary trends of the object to be identified; if the straight linear segments do not create a (Continued)

target object that satisfy a predetermined condition, determining the first boundary according to the predetermined condition; according to the first boundary, determining the second boundary; and by using positions of the first boundary and the second boundary, drawing a peripheral boundary of the object to be identified.

12 Claims, 9 Drawing Sheets

(51) Int. Cl.
    *G06V 20/56*    (2022.01)
    *G06V 20/58*    (2022.01)

(52) U.S. Cl.
    CPC .. *G06V 20/588* (2022.01); *G06T 2207/20012* (2013.01); *G06T 2207/30252* (2013.01); *G06V 2201/07* (2022.01)

(56) References Cited

U.S. PATENT DOCUMENTS

| | | | |
|---|---|---|---|
| 2008/0080785 A1* | 4/2008 | Ford | G06V 10/30 382/275 |
| 2011/0009732 A1* | 1/2011 | Sugiyama | G06T 7/0016 600/410 |
| 2011/0206282 A1 | 8/2011 | Aisaka et al. | |
| 2015/0213611 A1 | 7/2015 | Dai | |

FOREIGN PATENT DOCUMENTS

| | | | | |
|---|---|---|---|---|
| CN | 102069646 A | | 5/2011 | |
| CN | 102890780 A | * | 1/2013 | ............. G06K 9/342 |
| CN | 104573704 A | | 4/2015 | |
| CN | 105447489 A | | 3/2016 | |
| CN | 107463667 A | | 12/2017 | |
| CN | 108681737 A | | 10/2018 | |
| EP | 2 461 290 | | 6/2012 | |
| JP | H11187288 A | * | 7/1990 | |
| WO | WO-2006/126348 | | 11/2006 | |

OTHER PUBLICATIONS

Gupta et al. ("Automatic trimap generation for image matting," International Conference on Signal and Information Processing; Date of Conference: Oct. 6-8, 2016) (Year: 2016).*

Extended European Search Report (App. No. 19824956.7) dated Feb. 21, 2022 (11 pages).

ISR for PCT/CN2019/093770 dated Sep. 5, 2019, 5 pages.

CN Office Action for CN 201810711921.7 dated Sep. 1, 2020, 5 pages.

CN Search Report for CN 201810711921.7 dated Aug. 13, 2020, 3 pages.

Li, H. et al., Unsupervized Video Segmentation with Low Depth of Field, IEEE Transactions on Circuits and Systems for Video Technology, 2007, 17:12, 10 pages.

* cited by examiner

TERNARY IMAGE OBTAINING METHOD AND APPARATUS, AND VEHICLE

CROSS-REFERENCE TO RELATED APPLICATIONS

This application is the National Phase of International Application PCT/CN2019/093770, filed Jun. 28, 2019, which designated the United States. This application also includes a claim of priority under 35 U.S.C. § 119(a) and § 365(b) to Chinese Application No. 201810711921.7 filed Jun. 29, 2018, the entirety of which is hereby incorporated by reference.

TECHNICAL FIELD

The present disclosure relates to the technical field of autopilot, and particularly relates to a method and device for acquiring a three-value-processed image and a vehicle.

BACKGROUND

ADAS (Advanced Driver Assistant Systems) can, by using various sensors installed onboard the car, in the process of the travelling of the car, sense the ambient environment at any time, collect the data, identify and track objects of different movement states, and, by using the map data of the navigator, perform systematic computation and analysis, thereby enabling the driver to be aware of the potential dangers in advance, to effectively improve the comfortableness and the safety of automobile driving. Especially in the field of autopilot, some sensors in the ADAS, such as the vision camera, have the function of obtaining two-dimensional images, similar to that of the human being, so they can serve as the main sensors in the ADAS in autopilot vehicles.

The vision camera utilizes the function of image processing to catch the road images during vehicle driving, and assists the driver in accurately identifying the road in the autopilot mode, which is an important research topic in the field of autopilot. Moreover, the most critical image processing technique by using vision cameras is edge extraction, and by acquiring the three-value-processed image of the detected object, the edge information of the image can be detected more effectively, and the object and the environmental information in the image are captured by edge extraction.

Currently, although edge extraction is a critical technique of vision cameras, there is no effective and systematic method for acquiring a three-value-processed image with a good effect of the original image, to perform the extraction of the edge image.

SUMMARY

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

To solve the above problems, the technical solutions of the present disclosure are realized as follows:

A method for acquiring a three-value-processed image, wherein the method comprises: in a process of travelling of a vehicle, acquiring image data of an object to be identified;

acquiring first differential-image data of the image data;

by performing predetermined processing to an image in an image database that corresponds to the object to be identified, obtaining a three-value-processing coefficient;

according to a product between the three-value-processing coefficient and a maximum pixel value in the first differential-image data, obtaining a three-value-processing threshold; and by application of the three-value-processing threshold in the differential-image data, obtaining the three-value-processed image.

Optionally, the step of acquiring the first differential-image data of the image data comprises:

performing grayscale processing to the image data, to acquire a grayscale map of the image data of the object to be identified; and processing the grayscale map by using a Sobel algorithm, to acquire the first differential-image data of the image data.

Optionally, the step of, by performing predetermined processing to the image in the image database that corresponds to the object to be identified, obtaining the three-value-processing coefficient comprises:

performing difference processing to the image in the image database that corresponds to the object to be identified, to obtain second differential-image data;

by normalizing the second differential-image data, acquiring a differential-value distribution and a cumulative differential-value distribution of the second differential-image data; and according to the differential-value distribution and the cumulative differential-value distribution, acquiring a ratio of a separated noise to a signal in the second differential-image data, and determining the ratio to be the three-value-processing coefficient.

Optionally, the step of, by performing predetermined processing to the image in the image database that corresponds to the object to be identified, obtaining the three-value-processing coefficient comprises:

performing grayscale processing to the image in the image database that corresponds to the object to be identified, to obtain a grayscale map of the image data;

performing three-value processing to the gray scale map, to obtain a plurality of test three-value-processed images containing pixel data of the object to be identified;

according to the pixel quantities of the test three-value-processed images, acquiring a cumulative differential-value distribution probability of the pixel data; and according to the cumulative differential-value distribution probability, acquiring the three-value-processing coefficient.

Optionally, the image database contains historical image data acquired by the object to be identified within a predetermined time period.

As compared with the prior art, the method for acquiring a three-value-processed image according to the present disclosure has the following advantages: by, in a process of travelling of a vehicle, acquiring image data of an object to be identified; acquiring first differential-image data of the image data; by performing predetermined processing to an image in an image database that corresponds to the object to be identified, obtaining a three-value-processing coefficient; according to a product between the three-value-processing coefficient and a maximum pixel value in the first differential-image data, obtaining a three-value-processing threshold; and by application of the three-value-processing threshold in the differential-image data, obtaining the three-value-processed image, the method has the advantageous effect of systematically and effectively acquiring the three-value-processed image of the original image.

Another object of the present disclosure is to provide a device for acquiring a three-value-processed image, wherein the device comprises: an object-to-be-identified-image acquiring module configured for, in a process of travelling of a vehicle, acquiring image data of an object to be identified;

a differential-image-data acquiring module configured for acquiring first differential-image data of the image data;

a three-value-processing-threshold acquiring module configured for, according to a product between the three-value-processing coefficient and a maximum pixel value in the first differential-image data, obtaining a three-value-processing threshold; and a three-value-processed-image acquiring module configured for, by application of the three-value-processing threshold in the differential-image data, obtaining the three-value-processed image.

Optionally, the differential-image-data acquiring module comprises:

a grayscale-map acquiring submodule configured for performing grayscale processing to the image data, to acquire a grayscale map of the image data of the object to be identified; and a differential-image-data acquiring submodule configured for processing the grayscale map by using a Sobel algorithm, to acquire the first differential-image data of the image data.

Optionally, the three-value-processing-coefficient acquiring module comprises:

a second-differential-image-data acquiring submodule configured for performing difference processing to the image in the image database that corresponds to the object to be identified, to obtain second differential-image data;

a differential-distribution acquiring submodule configured for, by normalizing the second differential-image data, acquiring a differential-value distribution and a cumulative differential-value distribution of the second differential-image data; and a three-value-processing-coefficient acquiring submodule configured for, according to the differential-value distribution and the cumulative differential-value distribution, acquiring a ratio of a separated noise to a signal in the second differential-image data, and determining the ratio to be the three-value-processing coefficient.

Optionally, the three-value-processing-coefficient acquiring module comprises:

a grayscale-map acquiring submodule configured for performing grayscale processing to the image in the image database that corresponds to the object to be identified, to obtain a grayscale map of the image data;

a testing submodule configured for performing three-value processing to the grayscale map, to obtain a plurality of test three-value-processed images containing pixel data of the object to be identified;

a pixel-quantity acquiring submodule configured for, according to a preset pixel quantity and a preset pixel-occurrence probability, determining pixel quantities of the plurality of test three-value-processed images;

a distribution-value acquiring submodule configured for, according to the pixel quantities of the test three-value-processed images, acquiring a cumulative differential-value distribution probability of the pixel data; and a three-value-processing-coefficient acquiring submodule configured for, according to the cumulative differential-value distribution probability, acquiring the three-value-processing coefficient.

Optionally, the image database contains historical image data acquired by the object to be identified within a predetermined time period.

The device for acquiring a three-value-processed image has the advantages over the prior art the same as that of the method for acquiring a three-value-processed image described above, which is not discussed here further.

Another object of the present disclosure is to provide a vehicle, wherein the vehicle comprises the method and device for acquiring a three-value-processed image described above.

Yet another object of the present disclosure is to provide a computer program, wherein the computer program comprises a computer-readable code, and when the computer-readable code is executed on a calculating and processing device, the computer-readable code causes the calculating and processing device to implement the method for acquiring a three-value-processed image.

Still another object of the present disclosure is to provide a computer-readable medium, wherein the computer-readable medium stores the computer program described above.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present disclosure, and a person skilled in the art can obtain other figures according to these figures without paying creative work.

DETAILED DESCRIPTION

The exemplary embodiments of the present disclosure will be described in further detail below with reference to the drawings. Although the drawings illustrate the exemplary embodiments of the present disclosure, it should be understood that the present disclosure may be implemented in various forms, which should not be limited by the embodiments illustrated herein. In contrast, the purpose of providing those embodiments is to more clearly understand the present disclosure, and to completely convey the scope of the present disclosure to a person skilled in the art.

It should be noted that, subject to the avoiding of any conflict, the embodiments and the features of the embodiments of the present disclosure can be combined.

The present disclosure will be described in detail below with reference to the drawings and the embodiments.

The First Embodiment

Figure 1:
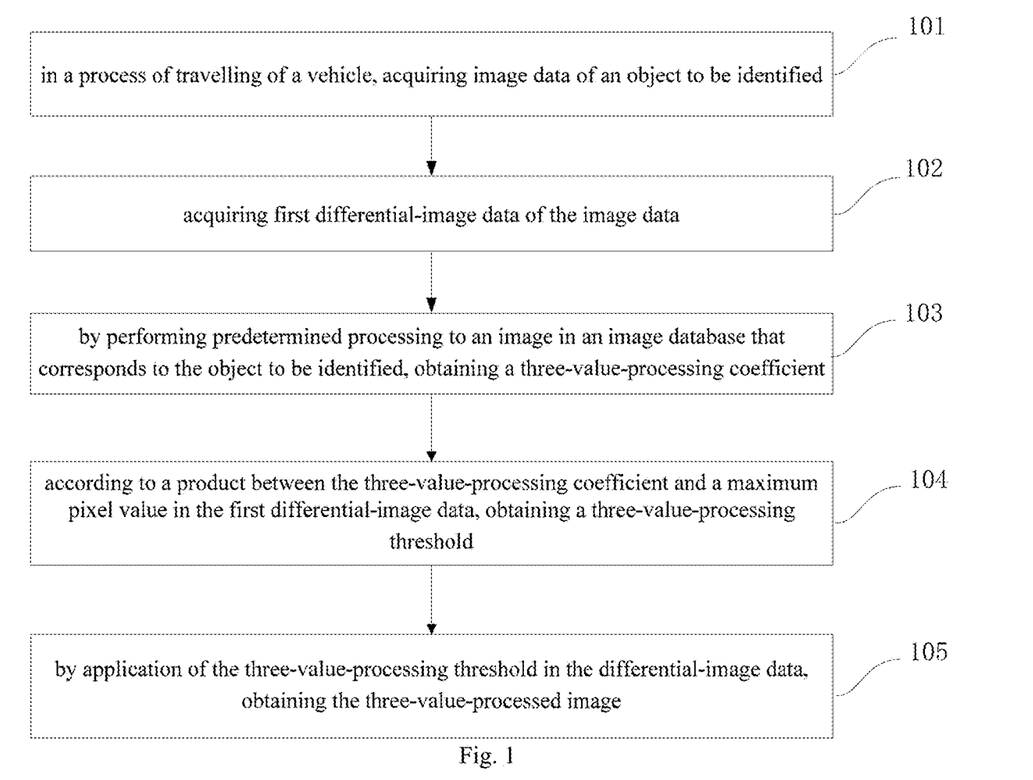
FIG. 1 is a flow chart of the method for acquiring a three-value-processed image according to the first embodiment of the present disclosure.

Referring to FIG. 1, FIG. 1 is a flow chart of the method for acquiring a three-value-processed image according to an embodiment of the present disclosure, which may particularly comprise the following steps:

Step 101: in a process of travelling of a vehicle, acquiring image data of an object to be identified.

In an embodiment of the present disclosure, the object to be identified in the travelling of the vehicle is collected by using a vision system of the vehicle.

Figure 2:
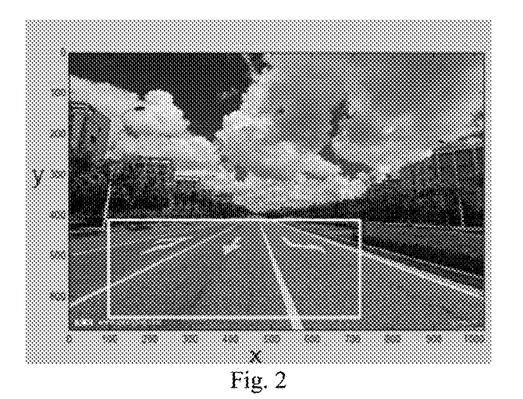
FIG. 2 is a schematic diagram of the result of the image processing according to an embodiment of the present disclosure.
Figure 3:
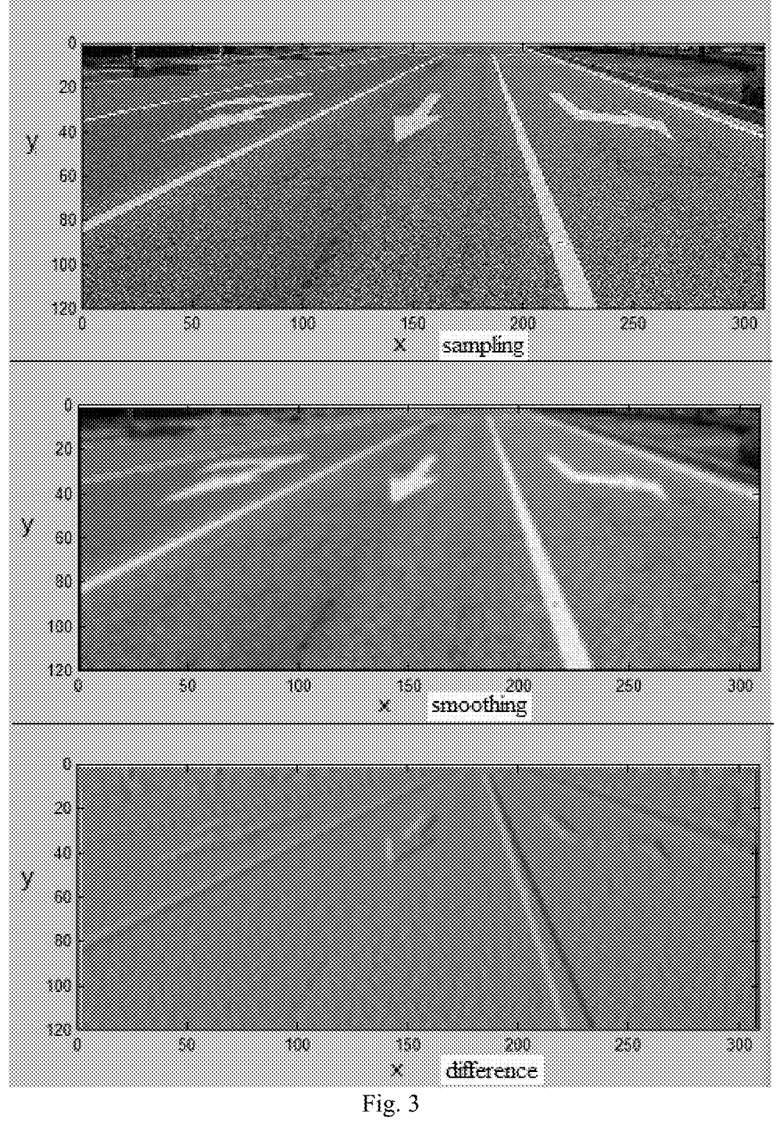
FIG. 3 is a schematic diagram of the result of the image processing according to an embodiment of the present disclosure.

For example, the acquired object to be identified is shown in FIG. 2. FIG. 2 may be a global image acquired from a camera in the vision system, wherein the image area marked by the white block is the main object to be identified currently of the vehicle, which is the travelling road. In order to improve the efficiency of the image processing in the later stage, as shown in FIG. 3, the image processing in the later stage mainly focuses on the image of the area in the white block.

Step 102: acquiring first differential-image data of the image data.

In an embodiment of the present disclosure, the image processing to the image may be performed by using a Sobel Filter, to acquire the first differential-image data. As shown in FIG. 3, the image to be processed is resampled and smoothing-processed, and subsequently the image is processed by using a Sobel Filter to obtain the differential-image data.

Particularly, the Sobel operator shown in the formula (1) is used:

$$FFF = \begin{bmatrix} -1 & 0 & 1 \\ -2 & 0 & 2 \\ -1 & 0 & 1 \end{bmatrix} \quad (1)$$

Figure 4:
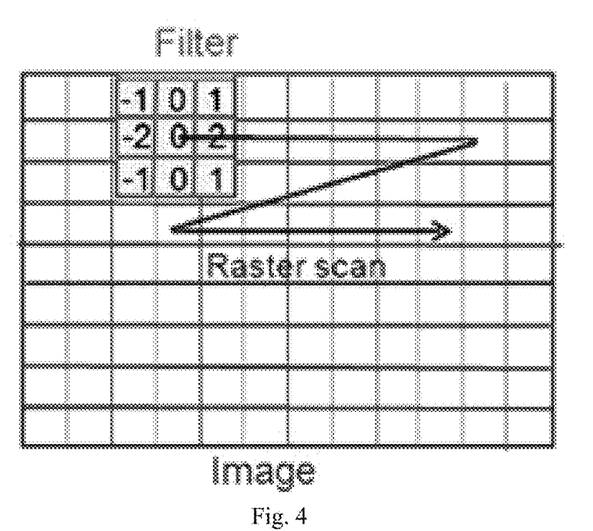
FIG. 4 is a schematic diagram of the principle of the image processing according to an embodiment of the present disclosure.

As shown in FIG. 4, a Raster Scan scans each of the pixel points in the image in the horizontal direction, and transforms the original image XXX(m,n) into the differential-image data of a differential image ddd(m,n), which may particularly refer to the following code:

for m=2:mm−1
  for n=2:nn−1
    W=XXX(m−1:m+1,n−1:n+1);
    WF=W.*FFF;
    ddd(m,n)=sum(WF(:));
  end
end Step 103: by performing predetermined processing to an image in an image database that corresponds to the object to be identified, obtaining a three-value-processing coefficient.

In an embodiment of the present disclosure, particularly, the differential image is three-value-processed by using the formula (2):

$$ttt(m, n) = \begin{cases} 1 & \text{ratio} * \max(|ddd(:)|) < ddd(m, n) \\ -1 & ddd(m, n) < -\text{ratio} * \max(|ddd(:)|) \\ 0 & \text{otherise} \end{cases} \quad (2)$$

In an embodiment of the present disclosure, particularly, the process comprises, firstly, by performing three-value processing of different thresholds to the image data of the object to be identified, obtaining an optimum-identification-result experience, and according to the experience, obtaining the range of the cumulative distribution probability of the positive-direction boundary pixels or the negative-direction boundary pixels of the three-value-processed image data; and then, according to the formula (2), acquiring the diagram of the differential-value distribution of the positive-direction boundary pixels of the differential-image data, and the cumulative distribution probability of the positive-direction boundary pixels or the negative-direction boundary pixels, and deducing reversely the three-value-processing coefficient of the range of the cumulative distribution probability of the above-described experience.

Figure 5:
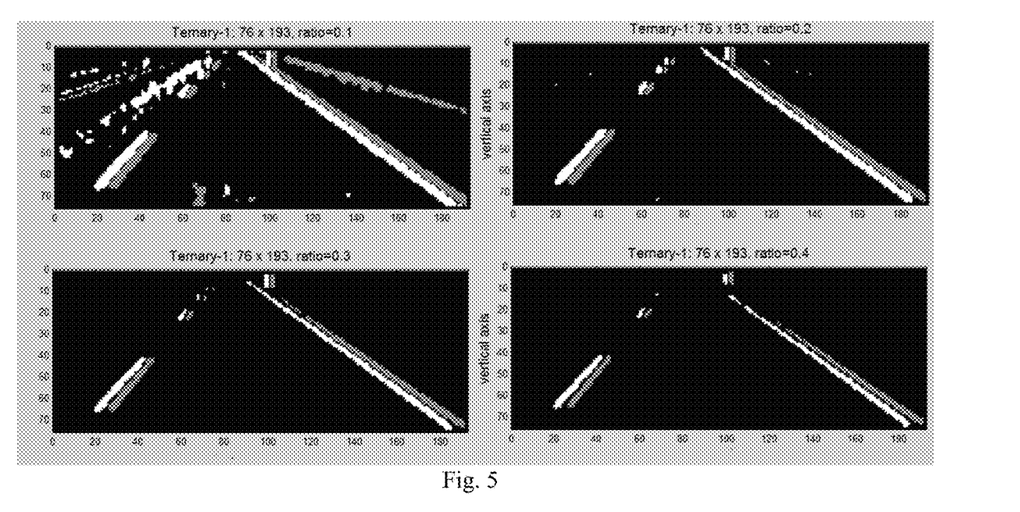
FIG. 5 is a schematic diagram of the result of the image processing according to an embodiment of the present disclosure.

For example, FIG. 5 shows a plurality of three-value-processed images that are obtained from the negative-direction boundary pixels in the plurality of differential diagrams. It can be determined by testing and observation by the researcher that all of the four diagrams satisfy the preset condition; in other words, they present the characteristics of little noises and clear boundaries. Furthermore, the range of the cumulative distribution probability of the positive-direction boundary pixels that corresponds to the four diagrams is 97%-99%, and the range of the probability distribution is the three-value-processing coefficient.

Figure 6:
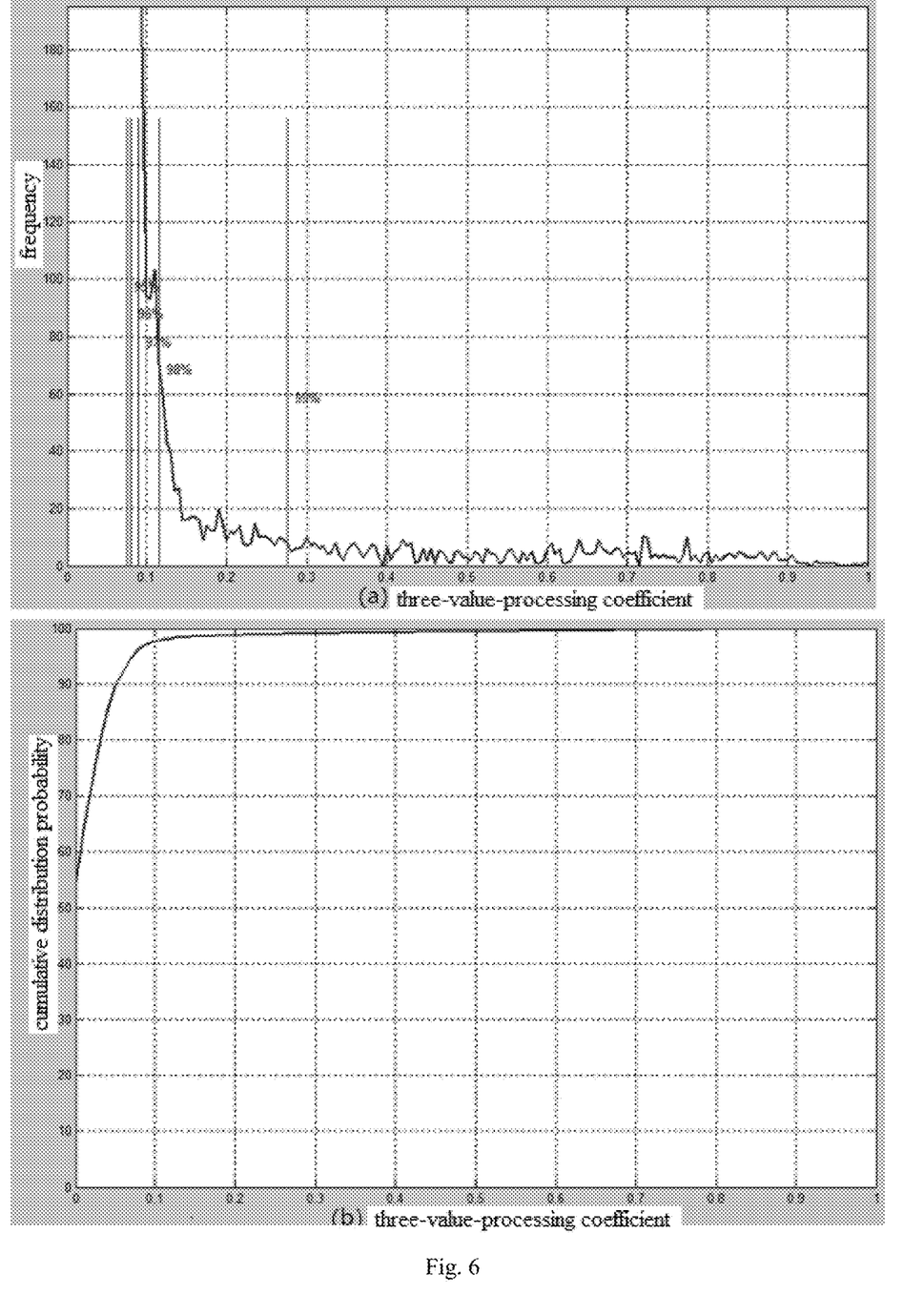
FIG. 6 is a schematic diagram of the principle of the image processing according to an embodiment of the present disclosure.

Therefore, as shown in FIG. 6, the differential-value-distribution diagram of the positive-direction boundary pixels that corresponds to the differential diagram shown in FIG. 3 (the upper half of FIG. 6) and the cumulative distribution probability of the positive-direction boundary pixels and the negative-direction boundary pixels (the lower half of FIG. 6) are acquired. As the predetermined cumulative distribution probability (threshold) previously acquired is 97%-99%, optimally, in the differential-value-distribution diagram shown in the upper half of FIG. 6, it can be acquired that the three-value-processing coefficient (ratio) that corresponds to the cumulative distribution probability of 97%-99% is 0.1-0.4.

Step 104: according to a product between the three-value-processing coefficient and a maximum pixel value in the first differential-image data, obtaining a three-value-processing threshold.

In an embodiment of the present disclosure, by multiplying the acquired three-value-processing coefficient and the maximum pixel value of the acquired first differential-image data, the three-value-processing threshold is obtained. As shown in FIG. 6, if the three-value-processing coefficient is 0.3, then, in FIG. 6(a), according to the histogram distribution of the maximum-pixel-value coefficient, it can be obtained that the corresponding three-value-processing threshold is 99%.

Step 105: by application of the three-value-processing threshold in the differential-image data, obtaining the three-value-processed image.

In an embodiment of the present disclosure, the differential-image data obtained above is further three-value-processed by using the acquired three-value-processing coefficient, to obtain the three-value-processed image of the differential-image data.

Particularly, the following three-value-processed image ttt(m,n) code may be referred, to acquire the three-value-processed image ttt(m,n):

for m=1:mm
  for n=1:nn
    ttt(m,n)=0
    if ddd(m,n)>Threshold
    ttt(m,n)=1
    else if ddd(m,n)←Threshold
    TTT(m,n)=−1
    end
  end
end By the above three-value-image processing, the values of each of the pixel points of the acquired three-value-processed image ttt(m,n) are selected from the set [−1,0,1]. Accordingly, the pixel points in the differential image ddd(m,n) that are greater than a preset threshold Threshold are assigned to be 1, wherein the value of the Threshold is ratio*max(|ddd(:)|), the pixel points in the differential image ttt(m,n) that are less than the preset threshold Threshold are assigned to be −1, and the remaining pixel points are assigned to be 0. Accordingly, the positive-direction boundary pixels with the value of 1 and the negative-direction boundary pixels with the value of −1 can be distinguished, and all of the other pixels than the boundary pixels are assigned to be 0.

For example, if the three-value-processing coefficient (ratio) obtained according to the step 103 is 0.1-0.4, then, according to the three-value-processing coefficient, by acquiring the ratios of the values of 0.1, 0.2, 0.3 and 0.4, a three-value-processed image having a good effect is obtained.

The embodiments of the present disclosure, by, in a process of travelling of a vehicle, acquiring image data of an object to be identified; acquiring first differential-image data of the image data; by performing predetermined processing to an image in an image database that corresponds to the object to be identified, obtaining a three-value-processing coefficient; according to a product between the three-value-processing coefficient and a maximum pixel value in the first differential-image data, obtaining a three-value-processing threshold; and by application of the three-value-processing threshold in the differential-image data, obtaining the three-value-processed image, realize the purpose of effectively and systematically acquiring a three-value-processed image with a good effect of the original image.

The Second Embodiment

Figure 7:
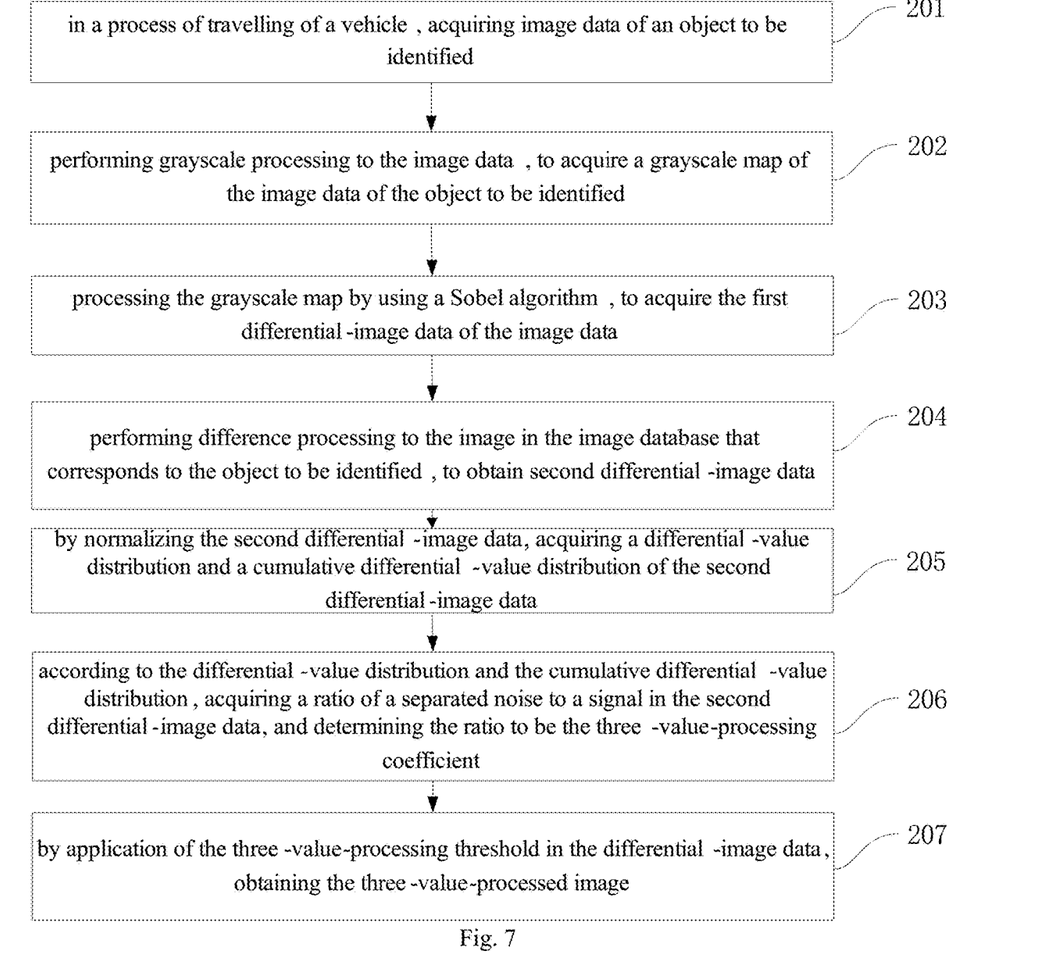
FIG. 7 is a flow chart of the method for acquiring a three-value-processed image according to the second embodiment of the present disclosure.

Referring to FIG. 7, FIG. 7 is a flow chart of the method for acquiring a three-value-processed image according to an embodiment of the present disclosure, which may particularly comprise the following steps:

Step 201: in a process of travelling of a vehicle, acquiring image data of an object to be identified.

This step is the same as the step 101, and is not discussed here in detail.

Step 202: performing grayscale processing to the image data, to acquire a grayscale map of the image data of the object to be identified.

In an embodiment of the present disclosure, as shown in FIG. 3, the original image is smoothed and grayscale-processed. Particularly, an image is formed by pixels of different grayscale values, and the distribution of the grayscales in the image is an important feature of the image. Moreover, the grayscale histogram expresses the distribution of the grayscales in the image, and can very intuitively exhibit the proportions that the grayscale levels in the image account for.

Step 203: processing the grayscale map by using a Sobel algorithm, to acquire the first differential-image data of the image data.

In an embodiment of the present disclosure, as described in the step 102, the grayscale map obtained in the step 202 is processed by using the Sobel algorithm, to acquire the differential-image data of the grayscale map, wherein the differential-image data are a matrix that is obtained from the convolution between a matrix corresponding to the grayscale map and a Sobel matrix.

Step 204: performing difference processing to the image in the image database that corresponds to the object to be identified, to obtain second differential-image data.

The image database contains historical image data acquired by the object to be identified within a predetermined time period.

In an embodiment of the present disclosure, the three-value-processed image is acquired by photographing a similar scene or the object to be identified within a predetermined time period, and the original images that are acquired multiple times are stored in an image database, to facilitate to acquire the second differential image at any time.

Step 205: by normalizing the second differential-image data, acquiring a differential-value distribution and a cumulative differential-value distribution of the second differential-image data.

In an embodiment of the present disclosure, difference-processing test is performed to the grayscale map obtained above multiple times, to obtain a plurality of second differential images. If 10 differential image tests are performed, and three-value processing tests of different thresholds are performed, as shown in FIG. 5, by the visual inspection of the technician, four diagrams of a satisfactory effect are obtained. It can be seen that the corresponding edges in the four diagrams are clear and visible, so the four diagrams are selected to be the three-value-processed image that satisfies the standard predetermined by the technician.

Therefore, as shown in FIG. 6, the corresponding second differential-image data in the four diagrams are selected and normalization-processed, to acquire the differential-valuedistribution diagram 6(a) and the cumulative differential-value-distribution diagram 6(b) of the second differential image.

Step 206: according to the differential-value distribution and the cumulative differential-value distribution, acquiring a ratio of a separated noise to a signal in the second differential-image data, and determining the ratio to be the three-value-processing coefficient.

In an embodiment of the present disclosure, as, in FIG. 6, the Sobel operator processes the positive-direction boundary pixels, the total pixels in the image NN=55825, the maximum pixel value max=975, the curve of FIG. 6(a) represents the proportional relation between the pixel values and the maximum pixel value max when the three-value-processing coefficient ratio is 0-1, and the cumulative distribution of the pixel values in the differential image shown in FIG. 6(b), when mapped in FIG. 6(a), is shown as a plurality of vertical lines, the correspondence relation between different pixel cumulative distributions and pixel differential-value distributions is exhibited.

In practical applications, the original images are processed in the same scene, the time quantity of the three-value processing of the images depends on the practical condition, and the three-value-processed image that satisfies the predetermined standard is selected by the detection of the naked eyes of the technician. The predetermined standard is determined by the technician according to the particular demands, for example, little noises, clear edges and so on. Subsequently, the histogram of the image selected above is acquired, i.e., the cumulative differential-value distribution probability of the pixel data shown in FIG. 6(b), and thus it can be known that the cumulative pixel distribution probability of the four diagrams described in FIG. 5 is 97%-99%.

According to the cumulative pixel distribution probability that has been determined, it is determined that a corresponding three-value-processing coefficient of approximately 0.3 is appropriate. In the subsequent three-value-image processing, for the same photographing scene or the same object to be identified, the three-value-processing coefficient may be directly used for the three-value-processed image processing, to obtain the most suitable three-value-processed image.

Preferably, the step further comprises:

Step A1: performing grayscale processing to the image in the image database that corresponds to the object to be identified, to obtain a grayscale map of the image data.

This step is similar to the step 202, and is not discussed here in detail.

Step A2: performing three-value processing to the grayscale map, to obtain a plurality of test three-value-processed images containing pixel data of the object to be identified.

Figure 8:
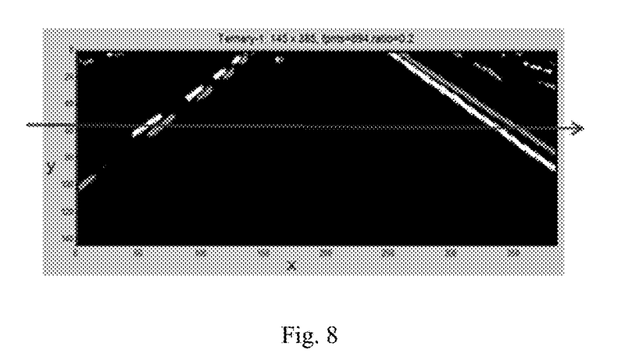
FIG. 8 is a schematic diagram of the principle of the image processing according to an embodiment of the present disclosure.
Figure 9:
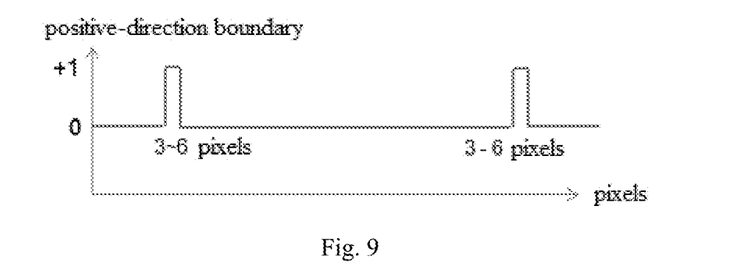
FIG. 9 is a schematic diagram of the principle of the image processing according to an embodiment of the present disclosure.

In an embodiment of the present disclosure, assuming that the three-value-processed image is formed by a plurality of lines in the horizontal direction, then on each of the lines are distributed a plurality of pixel values of the three-value-processed image. As shown in FIG. 8, it is a 145×385 three-value-processed image, so the three-value-processed image has 145 horizontal lines. As shown in FIG. 9, assuming that the value of the positive-direction boundary pixels distributed in one of the horizontal lines is 6-12, then, regarding one road, each of the road boundaries has 3-6 pixel points, which is the horizontal pixel quantity.

Step A3: according to a preset pixel quantity and a preset pixel-occurrence probability, determining pixel quantities of the plurality of test three-value-processed images.

In an embodiment of the present disclosure, further assuming that the probability of the existence of the road boundaries is 50%, then, the total pixel quantity is 12*0.5*145=870, and the cumulative distribution probability of the pixels is 1-870/(145*385)=98.4%; in other words, 98.4% is the preset distribution probability.

Step A4: according to the pixel quantities of the test three-value-processed images, acquiring a cumulative differential-value distribution probability of the pixel data.

In an embodiment of the present disclosure, from the differential-image-data matrix obtained above, the corresponding positive-direction boundary pixels (the pixels that are positive values) or negative-direction boundary pixels (the pixels that are negative values) are extracted, to obtain their histogram distribution that is similar to that of FIG. 6. The histogram of the differential-image data is analyzed, to obtain the differential-value distribution and the cumulative differential-value distribution probability of the pixel data of the differential-image data.

Step A5: according to the cumulative differential-value distribution probability, acquiring the three-value-processing coefficient.

In an embodiment of the present disclosure, because previously it is determined that 98.4% is the preset distribution probability, then, correspondingly to the preset distribution probability, the corresponding ratio can be found in the differential-value-distribution diagram of the pixel data, which is the three-value-processing coefficient.

Step 207: by application of the three-value-processing threshold in the differential-image data, obtaining the three-value-processed image.

This step is the same as the step 105, and is not discussed here in detail.

Figure 10:
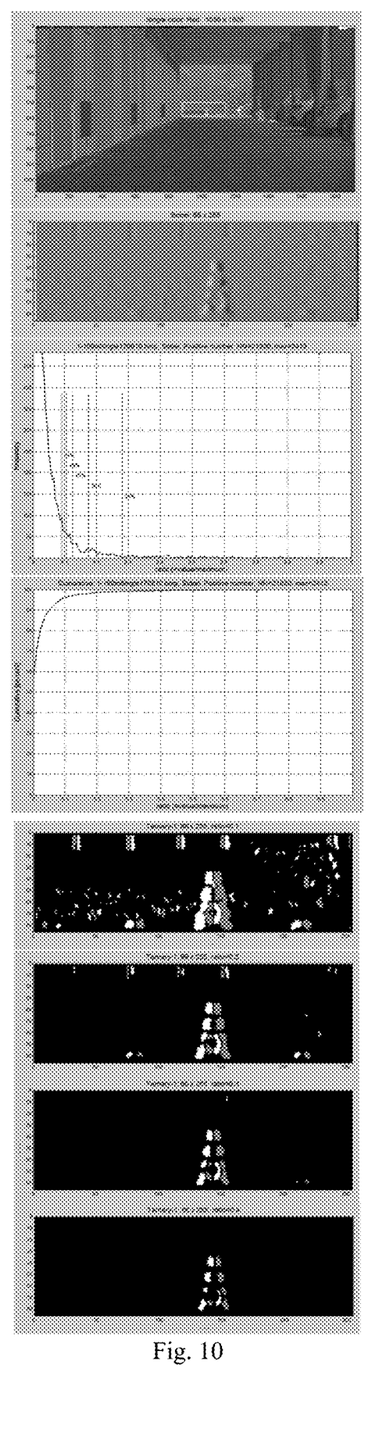
FIG. 10 is a schematic diagram of the process of the image processing according to an embodiment of the present disclosure.

In practical applications, the method provided above is not limited to be applied to road identification, but may also be applied to object identification. As shown in FIG. 10, if the traffic cone in a road is to be identified, firstly, the photographed original image is smoothed, grayscale-processed and difference-processed to obtain the differential image, and then, according to the differential image, the corresponding histogram is obtained, i.e., the differential-value distribution and the cumulative differential-value distribution probability of the pixel data of the differential-image data. It is known empirically that the cumulative distribution probability is 96%-99%, and thus the corresponding three-value-processing coefficient (ratio) is 0.1-0.4. Accordingly, the grayscale map is three-value-processed according to the three-value-processing coefficient, to obtain four three-value-processed images, from which the technician may, according to the practical demands, a corresponding three-value-processed image for further identification and processing of the traffic cone.

The embodiments of the present disclosure, by, in a process of travelling of a vehicle, acquiring image data of an object to be identified; performing grayscale processing to the image data, to acquire a grayscale map of the image data of the object to be identified; processing the grayscale map by using a Sobel algorithm, to acquire the first differential-image data of the image data; performing difference processing to the image in the image database that corresponds to the object to be identified, to obtain second differential-image data; by normalizing the second differential-image data, acquiring a differential-value distribution and a cumulative differential-value distribution of the second differential-image data; and according to the differential-value distribution and the cumulative differential-value distribution, acquiring a ratio of a separated noise to a signal in the second differential-image data, and determining the ratio to be the three-value-processing coefficient, realize the purpose of effectively and systematically acquiring a three-value-processed image with a good effect of the original image.

The Third Embodiment

Figure 11:
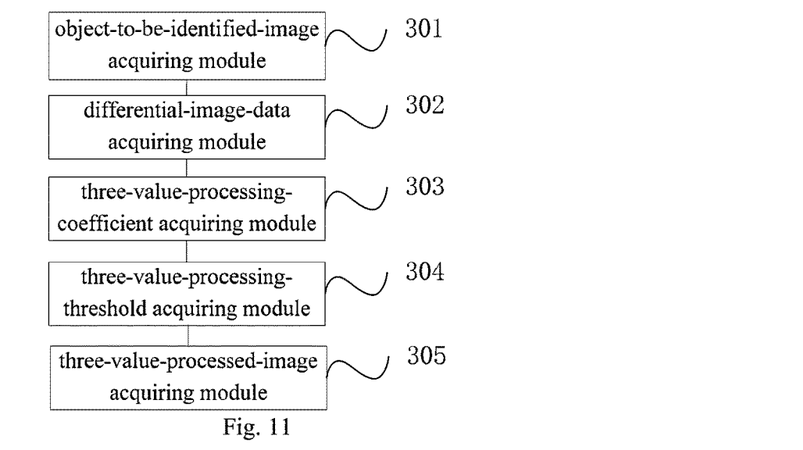
FIG. 11 is a structural block diagram of the device for acquiring a three-value-processed image according to the third embodiment of the present disclosure.

Referring to FIG. 11, FIG. 11 is a structural block diagram of the device for acquiring a three-value-processed image according to an embodiment of the present disclosure. The device comprises:

an object-to-be-identified-image acquiring module 301 configured for, in a process of travelling of a vehicle, acquiring image data of an object to be identified;

a differential-image-data acquiring module 302 configured for acquiring first differential-image data of the image data;

a three-value-processing-coefficient acquiring module 303 configured for, by performing predetermined processing to an image in an image database that corresponds to the object to be identified, obtaining a three-value-processing coefficient;

a three-value-processing-threshold acquiring module 304 configured for, according to a product between the three-value-processing coefficient and a maximum pixel value in the first differential-image data, obtaining a three-value-processing threshold; and a three-value-processed-image acquiring module 305 configured for, by application of the three-value-processing threshold in the differential-image data, obtaining the three-value-processed image.

Figure 12:
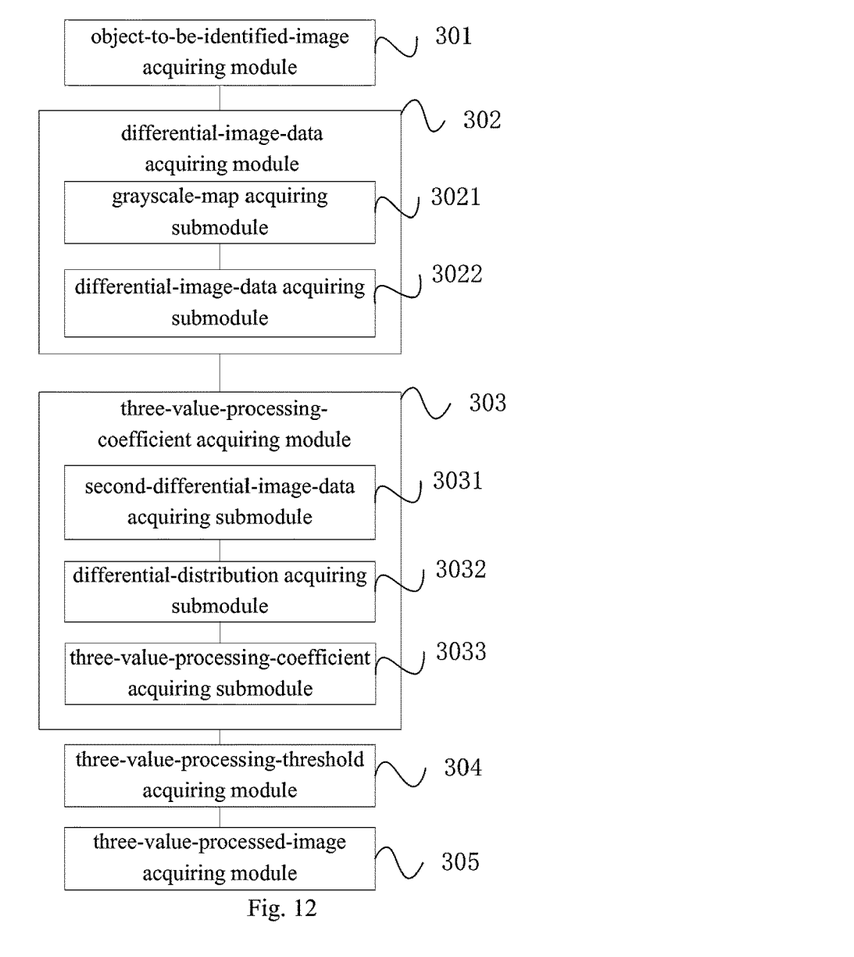
FIG. 12 is a structural block diagram of the device for acquiring a three-value-processed image according to the third embodiment of the present disclosure.

Referring to FIG. 12, FIG. 12 is a structural block diagram of the device for acquiring a three-value-processed image according to an embodiment of the present disclosure. The device comprises:

an object-to-be-identified-image acquiring module 301 configured for, in a process of travelling of a vehicle, acquiring image data of an object to be identified; and a differential-image-data acquiring module 302 configured for acquiring first differential-image data of the image data.

Preferably, the differential-image-data acquiring module 302 comprises:

a grayscale-map acquiring submodule 3021 configured for performing grayscale processing to the image data, to acquire a grayscale map of the image data of the object to be identified;

a differential-image-data acquiring submodule 3022 configured for processing the grayscale map by using a Sobel algorithm, to acquire the first differential-image data of the image data; and a three-value-processing-coefficient acquiring module 303 configured for, by performing predetermined processing to an image in an image database that corresponds to the object to be identified, obtaining a three-value-processing coefficient.

Preferably, the three-value-processing-coefficient acquiring module comprises:

a second-differential-image-data acquiring submodule 3031 configured for performing difference processing to the image in the image database that corresponds to the object to be identified, to obtain second differential-image data;

a differential-distribution acquiring submodule 3032 configured for, by normalizing the second differential-image data, acquiring a differential-value distribution and a cumulative differential-value distribution of the second differential-image data; and a three-value-processing-coefficient acquiring submodule 3033 configured for, according to the differential-value distribution and the cumulative differential-value distribution, acquiring a ratio of a separated noise to a signal in the second differential-image data, and determining the ratio to be the three-value-processing coefficient.

Preferably, the three-value-processing-coefficient acquiring module 303 comprises:

a grayscale-map acquiring submodule configured for performing grayscale processing to the image in the image database that corresponds to the object to be identified, to obtain a grayscale map of the image data;

a testing submodule configured for performing three-value processing to the grayscale map, to obtain a plurality of test three-value-processed images containing pixel data of the object to be identified;

a pixel-quantity acquiring submodule configured for, according to a preset pixel quantity and a preset pixel-occurrence probability, determining pixel quantities of the plurality of test three-value-processed images;

a distribution-value acquiring submodule configured for, according to the pixel quantities of the test three-value-processed images, acquiring a cumulative differential-value distribution probability of the pixel data; and a three-value-processing-coefficient acquiring submodule configured for, according to the cumulative differential-value distribution probability, acquiring the three-value-processing coefficient.

a three-value-processing-threshold acquiring module 304 configured for, according to a product between the three-value-processing coefficient and a maximum pixel value in the first differential-image data, obtaining a three-value-processing threshold; and a three-value-processed-image acquiring module 305 configured for, by application of the three-value-processing threshold in the differential-image data, obtaining the three-value-processed image.

Preferably, the image database contains historical image data acquired by the object to be identified within a predetermined time period.

The embodiments of the present disclosure, by using an object-to-be-identified-image acquiring module configured for, in a process of travelling of a vehicle, acquiring image data of an object to be identified; a differential-image-data acquiring module configured for acquiring first differential-image data of the image data; a three-value-processing-coefficient acquiring module configured for, by performing predetermined processing to an image in an image database that corresponds to the object to be identified, obtaining a three-value-processing coefficient; a three-value-processing-threshold acquiring module configured for, according to a product between the three-value-processing coefficient and a maximum pixel value in the first differential-image data, obtaining a three-value-processing threshold; and a three-value-processed-image acquiring module configured for, by application of the three-value-processing threshold in the differential-image data, obtaining the three-value-processed image, realize the purpose of effectively and systematically acquiring a three-value-processed image with a good effect of the original image.

The embodiments of the present disclosure further include a vehicle, wherein the vehicle comprises the method or device for acquiring a three-value-processed image of any one of the first embodiment to the third embodiment.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Part or all of the modules may be selected according to the actual demands to realize the purposes of the solutions of the embodiments. A person skilled in the art can understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the calculating and processing device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 13:
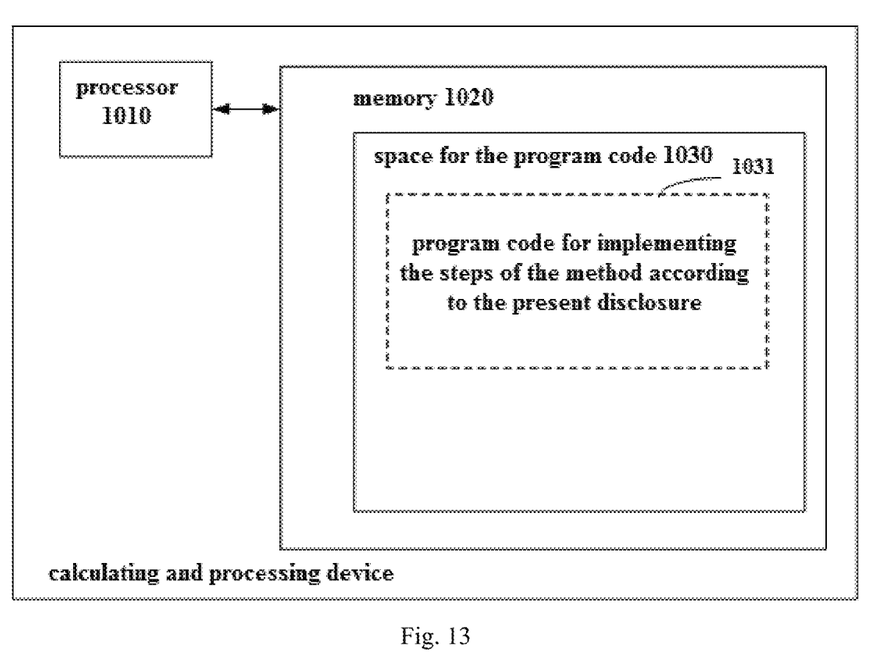
FIG. 13 is a schematic structural diagram of the computer processing device according to an embodiment of the present disclosure.
Figure 14:
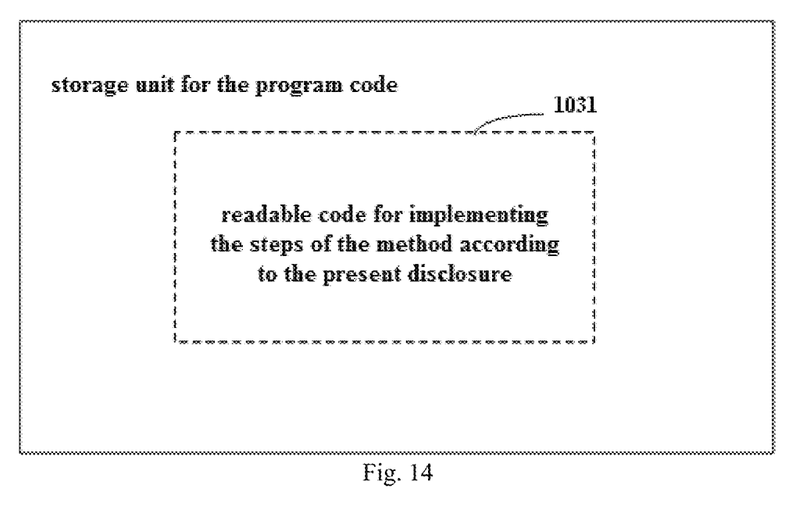
FIG. 14 is a schematic structural diagram of the storage unit according to an embodiment of the present disclosure.

For example, FIG. 13 shows a calculating and processing device that can implement the method according to the present disclosure. The calculating and processing device traditionally comprises a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1031 for program code may contain program codes 1031 for individually implementing each of the steps of the above method. Those program codes may be read from one or more computer program products or be written into the one or more computer program products. Those computer program products include program code carriers such as hard disk, compact disk (CD), memory card or floppy disk as shown in FIG. 14. Such computer program products are usually portable or fixed storage units. The storage unit may have storage segments or storage spaces with similar arrangement to the memory 1020 of the calculating and processing device in FIG. 13. The program codes may for example be compressed in a suitable form. Generally, the storage unit contains a computer-readable code 1031', which can be read by a processor like 1010. When those codes are executed by the calculating and processing device, the codes cause the calculating and processing device to implement each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail by referring to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A method for acquiring a three-value-processed image, wherein the method comprises:
    in a process of travelling of a vehicle, acquiring image data of an object to be identified;
    acquiring first differential-image data of the image data;
    by performing predetermined processing to an image in an image database that corresponds to the object to be identified, obtaining a three-value-processing coefficient;
    according to a product between the three-value-processing coefficient and a maximum pixel value in the first differential-image data, obtaining a three-value-processing threshold; and
    by application of the three-value-processing threshold in the differential-image data, obtaining the three-value-processed image;
    wherein the step of, by performing predetermined processing to the image in the image database that corresponds to the object to be identified, obtaining the three-value-processing coefficient comprises:
    performing difference processing to the image in the image database that corresponds to the object to be identified, to obtain second differential-image data;
    by normalizing the second differential-image data, acquiring a differential-value distribution and a cumulative differential-value distribution of the second differential-image data; and
    according to the differential-value distribution and the cumulative differential-value distribution, acquiring a ratio of a separated noise to a signal in the second differential-image data, and determining the ratio to be the three-value-processing coefficient.

2. The method for acquiring a three-value-processed image according to claim 1, wherein the step of acquiring the first differential-image data of the image data comprises:
    performing grayscale processing to the image data, to acquire a grayscale map of the image data of the object to be identified; and
    processing the grayscale map by using a Sobel algorithm, to acquire the first differential-image data of the image data.

3. The method for acquiring a three-value-processed image according to claim 1, wherein the step of, by performing predetermined processing to the image in the image database that corresponds to the object to be identified, obtaining the three-value-processing coefficient further comprises:
  performing grayscale processing to the image in the image database that corresponds to the object to be identified, to obtain a grayscale map of the image data;
  performing three-value processing using a plurality of different test thresholds to the grayscale map, to obtain a plurality of test three-value-processed images containing pixel data of the object to be identified;
  according to a preset pixel quantity and a preset pixel-occurrence probability, determining pixel quantities of the plurality of test three-value-processed images;
  according to the pixel quantities of the test three-value-processed images, acquiring a cumulative differential-value distribution probability of the pixel data; and
  according to the cumulative differential-value distribution probability, acquiring the three-value-processing coefficient.

4. The method for acquiring a three-value-processed image according to claim 1, wherein the image database contains historical image data acquired by the object to be identified within a predetermined time period.

5. A calculating and processing device for acquiring a three-value-processed image, wherein the calculating and processing device comprises a processor and a memory, wherein the memory stores a program code for implementing the operations of:
  in a process of travelling of a vehicle, acquiring image data of an object to be identified;
  acquiring first differential-image data of the image data;
  by performing predetermined processing to an image in an image database that corresponds to the object to be identified, obtaining a three-value-processing coefficient;
  according to a product between the three-value-processing coefficient and a maximum pixel value in the first differential-image data, obtaining a three-value-processing threshold; and
  by application of the three-value-processing threshold in the differential-image data, obtaining the three-value-processed image;
  wherein the operation of, by performing the predetermined processing to the image in the image database that corresponds to the object to be identified, obtaining the three-value-processing coefficient comprises:
  performing difference processing to the image in the image database that corresponds to the object to be identified, to obtain second differential-image data;
  by normalizing the second differential-image data, acquiring a differential-value distribution and a cumulative differential-value distribution of the second differential-image data; and
  according to the differential-value distribution and the cumulative differential-value distribution, acquiring a ratio of a separated noise to a signal in the second differential-image data, and determining the ratio to be the three-value-processing coefficient.

6. The calculating and processing device for acquiring a three-value-processed image according to claim 5, wherein the operation of acquiring the first differential-image data of the image data comprises:
  performing grayscale processing to the image data, to acquire a grayscale map of the image data of the object to be identified; and
  processing the grayscale map by using a Sobel algorithm, to acquire the first differential-image data of the image data.

7. The calculating and processing device for acquiring a three-value-processed image according to claim 5, wherein the operation of, by performing the predetermined processing to the image in the image database that corresponds to the object to be identified, obtaining the three-value-processing coefficient further comprises:
  performing grayscale processing to the image in the image database that corresponds to the object to be identified, to obtain a grayscale map of the image data;
  performing three-value processing using a plurality of different test thresholds to the grayscale map, to obtain a plurality of test three-value-processed images containing pixel data of the object to be identified;
  according to a preset pixel quantity and a preset pixel-occurrence probability, determining pixel quantities of the plurality of test three-value-processed images;
  according to the pixel quantities of the test three-value-processed images, acquiring a cumulative differential-value distribution probability of the pixel data; and
  according to the cumulative differential-value distribution probability, acquiring the three-value-processing coefficient.

8. The calculating and processing device for acquiring a three-value-processed image according to claim 5, wherein the image database contains historical image data acquired by the object to be identified within a predetermined time period.

9. A vehicle, wherein the vehicle comprises a calculating and processing device for acquiring a three-value-processed image, wherein the calculating and processing device comprises a processor and a memory, wherein the memory stores a program code for implementing the operations of:
  in a process of travelling of a vehicle, acquiring image data of an object to be identified;
  acquiring first differential-image data of the image data;
  by performing predetermined processing to an image in an image database that corresponds to the object to be identified, obtaining a three-value-processing coefficient;
  according to a product between the three-value-processing coefficient and a maximum pixel value in the first differential-image data, obtaining a three-value-processing threshold; and
  by application of the three-value-processing threshold in the differential-image data, obtaining the three-value-processed image;
  wherein the operation of, by performing the predetermined processing to the image in the image database that corresponds to the object to be identified, obtaining the three-value-processing coefficient comprises:
  performing difference processing to the image in the image database that corresponds to the object to be identified, to obtain second differential-image data;
  by normalizing the second differential-image data, acquiring a differential-value distribution and a cumulative differential-value distribution of the second differential-image data; and
  according to the differential-value distribution and the cumulative differential-value distribution, acquiring a ratio of a separated noise to a signal in the second differential-image data, and determining the ratio to be the three-value-processing coefficient.

10. The vehicle according to claim 9, wherein the operation of acquiring the first differential-image data of the image data comprises:
   performing grayscale processing to the image data, to acquire a grayscale map of the image data of the object to be identified; and
   processing the grayscale map by using a Sobel algorithm, to acquire the first differential-image data of the image data.

11. The vehicle according to claim 9, wherein the operation of,
   by performing the predetermined processing to the image in the image database that corresponds to the object to be identified, obtaining the three-value-processing coefficient further comprises:
   performing grayscale processing to the image in the image database that corresponds to the object to be identified, to obtain a grayscale map of the image data;
   performing three-value processing using a plurality of different test thresholds to the grayscale map, to obtain a plurality of test three-value-processed images containing pixel data of the object to be identified;
   according to a preset pixel quantity and a preset pixel-occurrence probability, determining pixel quantities of the plurality of test three-value-processed images;
   according to the pixel quantities of the test three-value-processed images, acquiring a cumulative differential-value distribution probability of the pixel data; and
   according to the cumulative differential-value distribution probability, acquiring the three-value-processing coefficient.

12. The vehicle according to claim 9, wherein the image database contains historical image data acquired by the object to be identified within a predetermined time period.

* * * * *